United States Patent
Bilobrov (10) Patent No.: US 9,899,036 B2
(45) Date of Patent: *Feb. 20, 2018

(54) GENERATING A REFERENCE AUDIO FINGERPRINT FOR AN AUDIO SIGNAL ASSOCIATED WITH AN EVENT

(71) Applicant: Facebook, Inc., Menlo Park, CA (US)

(72) Inventor: Sergiy Bilobrov, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,464

(22) Filed: Aug. 31, 2016

(65) Prior Publication Data
US 2016/0372137 A1    Dec. 22, 2016

Related U.S. Application Data (63) Continuation of application No. 14/052,521, filed on Oct. 11, 2013, now Pat. No. 9,466,317.

(51) Int. Cl.
    *H04R 29/00*      (2006.01)
    *G10L 25/54*      (2013.01)
    *G06F 17/30*      (2006.01)
    *H04R 3/04*       (2006.01)

(52) U.S. Cl.
    CPC ........ *G10L 25/54* (2013.01); *G06F 17/30743* (2013.01); *H04R 3/04* (2013.01); *H04R 29/00* (2013.01)

(58) Field of Classification Search
    CPC ...... H04R 29/00; H04R 3/04; H04R 2410/00; H04R 2499/11; H04R 2499/13; H04R 2227/001; H04R 2430/01; H04R 2201/023; H04R 2225/39; H04R 2225/41; H04R 2227/007; H04R 2420/03; H04R 2460/03; H04R 25/305; H04R 25/505; H04R 25/55; H04R 25/554; H04R 25/558; H04R 25/70
    USPC .......................................... 381/56
    See application file for complete search history.

(56) References Cited

U.S. PATENT DOCUMENTS

| | | | | |
|---|---|---|---|---|
| 2004/0202355 | A1* | 10/2004 | Hillhouse | G06K 9/00087 382/124 |
| 2007/0008078 | A1* | 1/2007 | Sau | G07C 9/00158 340/330 |
| 2010/0241845 | A1* | 9/2010 | Alonso | H04L 9/3231 713/150 |
| 2012/0224711 | A1* | 9/2012 | Kim | H04L 67/18 381/77 |

(Continued)

*Primary Examiner* — Akelaw Teshale
(74) *Attorney, Agent, or Firm* — Fenwick & West LLP (57) ABSTRACT

An audio identification system generates a reference audio fingerprint associated with an event. The reference audio fingerprint is generated from samples of an audio signal associated with the event captured by multiple devices. To generate the reference audio fingerprint, fingerprints are generated from each sample, and the generated fingerprints are temporally aligned. Fingerprints associated a temporally overlapping portion of the audio signal are averaged, and the average value is associated with the temporally overlapping portion of the audio signal and included in the reference audio fingerprint. The reference audio fingerprint is stored along with identifying information, such as an event name, an event time, an event date, or other information describing the event associated with the audio signal from which the samples were captured.

20 Claims, 4 Drawing Sheets

(56) References Cited

U.S. PATENT DOCUMENTS

| | | | | |
|---|---|---|---|---|
| 2012/0264446 | A1* | 10/2012 | Xie | G01C 22/00 |
| | | | | 455/456.1 |
| 2013/0136089 | A1* | 5/2013 | Gillett | H04W 72/048 |
| | | | | 370/329 |
| 2013/0294594 | A1* | 11/2013 | Chervets | H04M 3/56 |
| | | | | 379/202.01 |
| 2014/0161263 | A1* | 6/2014 | Koishida | G10L 19/018 |
| | | | | 381/56 |
| 2014/0379340 | A1* | 12/2014 | Timem | G06F 21/32 |
| | | | | 704/246 |
| 2015/0004935 | A1* | 1/2015 | Fu | H04W 12/08 |
| | | | | 455/411 |

\* cited by examiner

GENERATING A REFERENCE AUDIO FINGERPRINT FOR AN AUDIO SIGNAL ASSOCIATED WITH AN EVENT

CROSS-REFERENCE TO RELATED APPLICATIONS

This application is a continuation of U.S. application Ser. No. 14/052,521 filed Oct. 11, 2013, which is incorporated by reference in their entirety.

BACKGROUND

This invention generally relates to identifying audio, and more specifically to using a combination of audio fingerprints captured by multiple users attending an event to identify an audio signal from the event.

Real-time identification of audio signals is increasingly used in various applications. For example, many systems use various audio signal identification methods for identifying the name, artist, and/or album of an unknown song. Many audio signal methods generate "test" audio fingerprint for an audio signal, where the test audio fingerprint includes characteristic information about the audio signal usable for identifying the audio signal. The characteristic information about the audio signal may be based on acoustical and perceptual properties of the audio signal. To identify the audio signal, the test audio fingerprint generated from the audio signal is compared to a database including reference audio fingerprints associated with identifying information.

However, conventional audio identification schemes are ill-suited for generating a reference audio fingerprint for identifying certain types of continuous audio signal. For example, conventional audio identification schemes are unable to accurately identify an audio signal for an event based on audio fingerprints because of their inability to generate a reference audio fingerprint that represents the complete audio signal associated with the event. Conventional audio identification techniques are unable to generate a reference fingerprint for an audio signal by combining various test audio fingerprints associated with the audio signal. In particular, conventional techniques for audio signal identification are unable to incorporate on the fly the test fingerprints into database of reference fingerprints while dynamically updating the database to expedite access to newly added test fingerprints.

SUMMARY

To generate a reference audio fingerprint for an audio signal associated with an event attended by multiple users, multiple test audio fingerprints captured by client devices associated with multiple users are received. Reference fingerprints from live events, such as concerts, live performances, sport events and the like, cannot be obtained in advance because they are captured in real-time from live audio and/or video streams captured during the event. For example, audio fingerprints generated from portions of audio data captured during the event are added to a database of audio fingerprints as the audio fingerprints are generated. Systems for generating an audio fingerprint identifying an audio signal captured during an event may be located on the event site for recording live audio content or may be in a location remote from the event and receiving audio data broadcast from the event site. In one embodiment, a system identifying an audio signal associated with an event generates a complete reference fingerprint for the audio signal associated with the event based on an uninterrupted stream of audio data captured during the event. In one embodiment, a reference fingerprint for the audio signal captured during the event is generated from samples of the audio signal captured by multiple devices, so the samples may not be continuous in time due to copyright restrictions or technical limitations.

A test audio fingerprint is generated by identifying a sample or portion of an audio signal. The sample may include one or more discrete frames each corresponding to different fragments of the audio signal. For example, a 1 second sample of an audio signal includes 20 discrete frames each corresponding to 50 ms fragments of the audio signal. Test audio fingerprints captured by client devices associated with different users may be generated from samples of the audio signal corresponding to different time intervals of the audio signal. The various test audio fingerprints are temporally aligned and then combined to generate a reference fingerprint associated with the event. Subsequent test audio fingerprints are compared to the generated reference fingerprint to determine if an audio signal from which a test audio fingerprint was captured matches the audio signal associated with the event.

In one embodiment, data associated with audio samples received from various users of an audio identification system or a social networking system is used to identify audio samples captured during an event. For example, audio samples associated with a common location and associated with times within a specified time interval are determined to be associated with an event. Test audio fingerprints are generated from each of the audio samples determined to be associated with an event. The test audio fingerprints are temporally aligned and combined to generate the reference audio fingerprint for the event. This allows samples of an audio signal captured by various client devices at different times and/or locations associated with an event to be combined into a reference audio fingerprint associated with the event.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention generate a reference audio fingerprint associated with an event based on a plurality of test audio fingerprints generated from audio sample captured by client devices of various users attending the event. The plurality of test audio fingerprints are temporally aligned, and portions of various test audio fingerprints that temporally overlap are combined and averaged to generate a reference audio fingerprint associated with the event. Additional test audio fingerprints may be compared to the reference audio fingerprint associated with the event to determine if the test audio fingerprint matches an audio signal associated with the event.

Figure 1A:
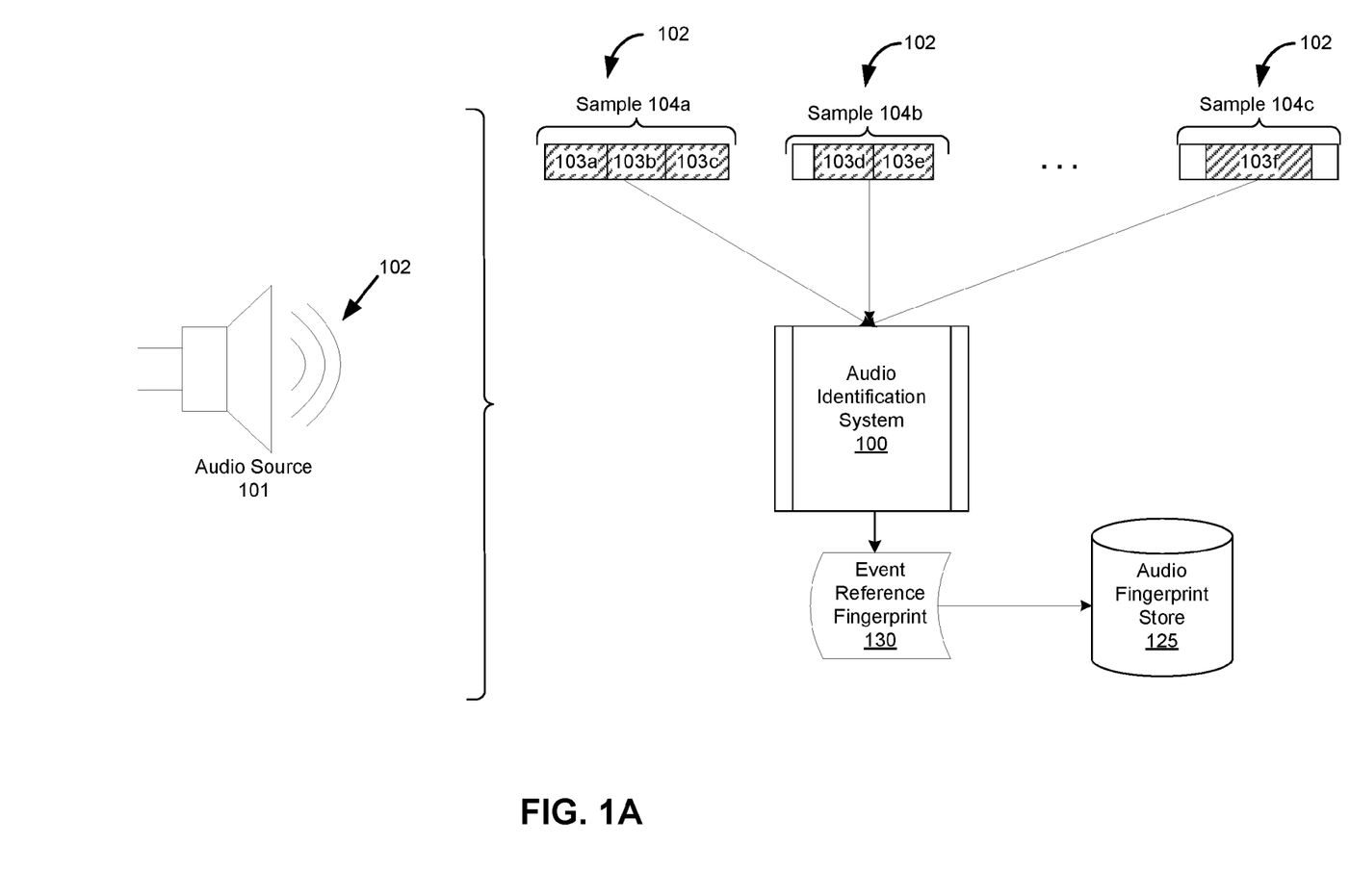
FIG. 1A is a process flow diagram of generating a reference audio fingerprint associated with an event, in accordance with an embodiment of the invention.

FIG. 1A is a process flow diagram of generating a reference audio fingerprint associated with an event. In FIG. 1A, an audio source 101 generates an audio signal 102. The audio source 101 may be any entity suitable for generating audio (or a representation of audio), such as a person, an animal, speakers of a mobile device, a desktop computer transmitting a data representation of a song, or other suitable entity generating audio. The audio signal 102 may be generated in association with an event with many users of an audio identification system 100, or other suitable system, in attendance. For example, the audio source 101 generates the audio signal 102 at a concert, a symphony, a gathering, a ceremony, a move, a show, a musical, or other suitable event. Additionally, at an event, multiple audio sources 101 may generate the audio signal 102. For example, multiple speakers in different locations are audio sources 101 generating the audio signal 102 at an event.

Multiple users attending the event capture samples 104 of the audio signal 102 using client devices. Examples of client devices include mobile computing devices, laptops, tablet computers, or any other suitable device including a microphone. Different client devices capture distinct samples 104 of the audio signal 102. For example, client devices in different geographic locations associated with an event capture samples 104 of the audio signal 102 generated by different audio sources 101, such as speakers in different locations. Additionally, different client devices may capture samples 104 corresponding to different time intervals of the audio signal. Hence, the captured samples 104 may correspond to portions of the audio signal 102 originating from different audio sources 101 and/or correspond to different time intervals of the audio signal 102.

In the example shown by FIG. 1A, various samples 104a, 104b, 104c of the audio signal 102 each include one or more discrete frames 103. For example, sample 104a includes frames 103a, 103b, 103c, while sample 104b includes frames 103d, 103e, and sample 104c includes frame 103f. Each frame 103 corresponds to a particular time interval of the audio signal 102. For example, sample 104 a is captured by a first client device and includes frame 103a corresponding to a portion of the audio signal 102 between times $t_0$ and $t_1$, while frames 103b and 103c correspond to portions of the audio signal 102 between times $t_1$ and $t_2$, and $t_2$ and $t_3$, respectively. Continuing the preceding example, sample 104b is recorded by an additional client device and includes frames 103d and 103e, which correspond to portions of the audio signal 102 between times $t_4$ and $t_5$, and $t_4$ and $t_5$, respectively, while sample 104c is recorded by another client device and includes frame 103f, which includes portions of the audio signal 102 between times $t_{n-1}$ and $t_n$. However, a single client device may capture each of the samples 104a, 104b, 104c. Additionally, different frames 103 may correspond to continuous time intervals of the audio signal 102, discontinuous time intervals of the audio signal 102, or overlapping time intervals of the audio signal 102.

Each frame 103 of a sample 104 corresponds to a length of time of the audio signal 102, such as 25 ms, 50 ms, 100 ms, 200 ms, etc. As further described below in conjunction with FIG. 3, the audio identification system 100 generates a reference audio fingerprint 130 associated with an event from multiple samples 104 of the audio signal 102 captured during the event. In one embodiment, the audio identification system 100 determines whether an audio characteristic of various frames 103 from different samples 104 satisfy a threshold condition. Frames 103 having an audio characteristic that does not satisfy the threshold condition are not selected for generating the reference audio fingerprint 130. As further described below in conjunction with FIG. 3, frames 103 from a plurality of samples 104 are selected and temporally aligned using any suitable technique. Overlapping frames are combined and temporally aligned, and then averaged to generate the reference audio fingerprint 130. Averaging the temporally aligned samples 104 allows the generated reference audio fingerprint 130 to more accurately represent the event by minimizing possible distortions and noise among the various samples 104.

For example, test audio fingerprints are generated from various samples 104 of an audio signal and are stored in a database. The test audio fingerprints are compared to other test audio fingerprints based on samples that overlap one or more of the samples 140. In a noisy environment such as a concert, game or bar, the background noise captured by devices located close to each other should be very similar. Thus, test audio fingerprints received from devices within a threshold distance of each other have at least a threshold similarity score when the main portion of the audio signal 102 is extracted and the background noise in the samples 104 to background noise of audio fingerprints generated from other samples. The similarity score between test audio fingerprints representing background noise is highly correlated with physical distance between devices from which test audio fingerprints are received. A higher correlation between test audio fingerprints generated from background noise in various signals indicates that the devices from which samples used to generate the test audio fingerprints were closer to each other when the fingerprints were generated. In addition, test audio fingerprints based on samples within a threshold time interval of each other are also likely to have at least a threshold similarity score.

For example, the relative positions of several devices may be calculated by triangulation based on the distances between the corresponding fingerprints, as the distance between two devices is proportional to the distance between fingerprints, which may be calculated using any suitable technique, containing background noise captured from different devices while also being inversely proportional to the average noise level in the location including the devices. Analogously, the average noise level in a location is proportional to a distance between a test fingerprint generated from a sample captured from the location and a reference audio fingerprint generated from various test fingerprints generated from samples captured from the location by one or more devices.

In another embodiment, test audio fingerprints generated from audio signals captured by two devices are used to calculate the direction and orientation of the two devices relative to each other. Because a device's microphones are more sensitive to capturing audio data originating from specific directions and less sensitive to capturing audio data originating from the remaining directions. For example, unidirectional microphones are more sensitive to audio data captured from an audio source 101 positioned along an axis perpendicular to a plane including an audio capture sensor of the microphone. Rotating the device including an audio capture device, or rotating the audio capture device itself, so the audio capture device faces different directions modifies the test audio fingerprints generated by from the device for an audio signal, allowing use of test audio fingerprints generated from samples captured by different devices to be used to estimating the relative orientation between different devices.

Additionally, separately generating and comparing low and high frequency audio fingerprints improves the accuracy of calculating the relative orientation and distance between different devices capturing an event audio signal, as a microphone's directional characteristics are correlated to audio signal frequency. For example, a microphone is typically omnidirectional regarding low-frequency but becomes more direction-specific when capturing higher-frequency portions of an audio signal. Based on the effect of frequency on an audio capture device's directionality, a user of a social networking system may "scan" the location where an event during which an audio signal is captured to identify additional users of the social networking system connected to the user also at the location. In one embodiment, a client device capturing an audio signal may also identify one or more additional users of a system (e.g., a social networking system attending an event associated with the audio signal captured by the client device). For example, if a client device associated with a user of a social networking system that is capturing an audio signal associated with an event has a specified orientation relative to a client device associated with an additional user of the social networking system connected to the user that is also capturing the audio signal associated with the event, information identifying the additional user is presented to the user via the user's client device. In one embodiment, the additional user is identified to the user if there is at least a threshold similarity between a test audio fingerprint generated by the client device associated with the user and a test audio fingerprint generated by the client device associated with the additional user. In this embodiment, client devices associated with the user and with the additional user are concurrently recording the audio signal associated with the event and identifying test audio fingerprints. Real-time analysis of the test audio fingerprints generated by the client device associated with the user and the client device associated with the additional user, allows a social networking system or other system to identify a connection between the user and the additional user, determine the client devices associated with the user and with the additional user are at an event, and notify the user that the additional user is at the event as well as the location of the client device associated with the additional user to the client device associated with the user.

The reference audio fingerprint 130 includes characteristic information describing the audio signal 102 captured during the event. Such characteristic information may indicate acoustical and/or perceptual properties of the audio signal 102 captured during event. In one embodiment, the audio identification system 100 stores information associated with the event, such as a name, location and date, along with the generated reference audio fingerprint 130. The audio identification system 100 stores the reference audio fingerprint 130 and associated information in an audio fingerprint store 125.

Figure 1B:
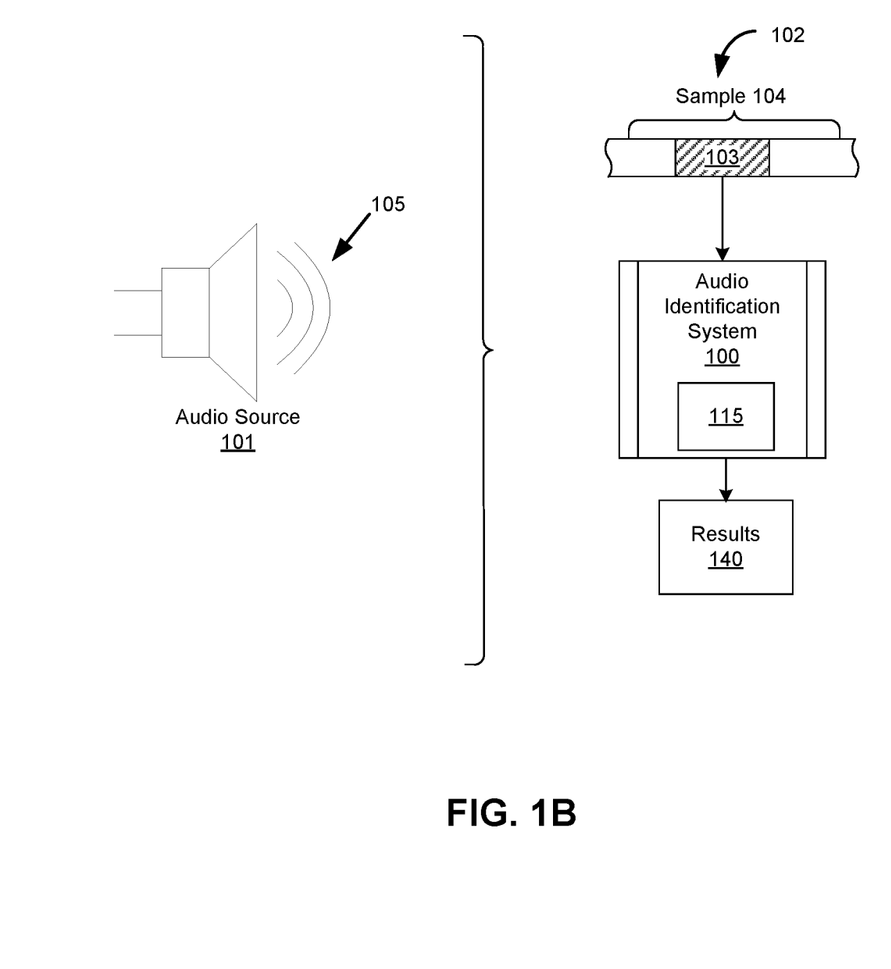
FIG. 1B is a process flow diagram of a process for identifying audio signals, in accordance with an embodiment of the invention.

After storing the reference audio fingerprint 130, the audio identification system 100 may compare subsequently received test audio fingerprints 115 to the reference audio fingerprint 130 to determine if the test audio fingerprint 115 matches the audio signal 102 associated with the event. As shown in FIG. 1B, the audio identification system 100 generates a test audio fingerprint 115 for an audio signal 105 using a sample 104 including one or more the frames 103. The test audio fingerprint 115 may include characteristic information describing the audio signal 105. Such characteristic information may indicate acoustical and/or perceptual properties of the audio signal 102. The audio identification system 100 matches the generated test audio fingerprint 115 against a set of candidate reference audio fingerprints, including the reference audio fingerprint 130 associated with the event.

To match the test audio fingerprint 115 to the candidate reference audio fingerprint, a similarity score between the candidate reference audio fingerprint and the test audio fingerprint 115 is computed. The similarity score measures the similarity between the audio characteristics of a candidate reference audio fingerprint and the audio characteristics of a test audio fingerprint 115. In one embodiment, the test audio fingerprint 115 is determined to match a candidate reference audio fingerprint if a corresponding similarity score meets or exceeds a similarity threshold.

When the reference audio fingerprint 130 associated with the event matches the test audio fingerprint 115, the audio identification system 100 retrieves identifying and/or other related information associated with the matching reference audio fingerprint 130. For example, the audio identification system 100 retrieves information related to the event, such as artists, titles of songs played at the event, an event name, a date associated with the event, event location, or other information associated with the matching reference audio fingerprint 130. The retrieved identifying and/or other related information may be associated with the audio signal 102 associated with the event and included in a set of search results 140 or other data to associate with the audio signal 105.

System Architecture

Figure 2A:
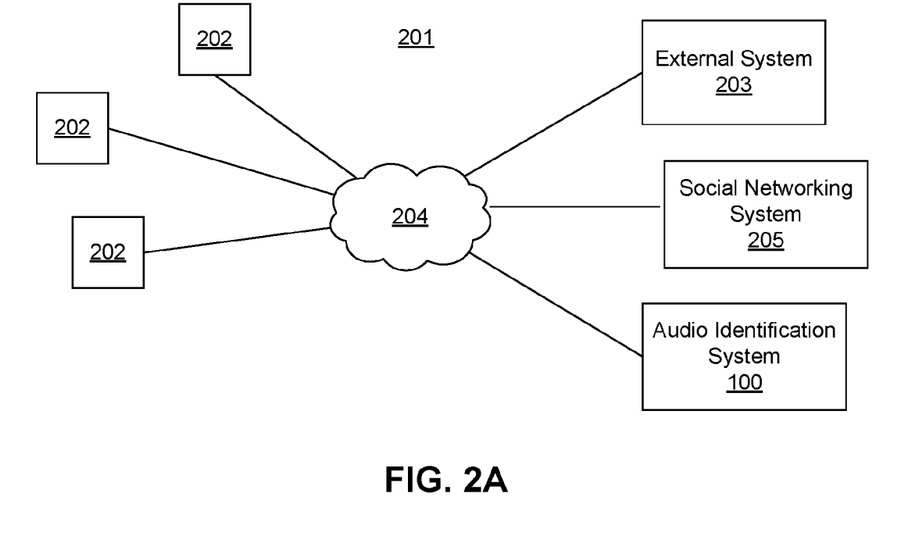
FIG. 2A is a block diagram illustrating a system environment including an audio identification system, in accordance with embodiments of the invention.

FIG. 2A is a block diagram illustrating one embodiment of a system environment 201 including an audio identification system 100. As shown in FIG. 2A, the system environment 201 includes one or more client devices 202, one or more external systems 203, the audio identification system 100, a social networking system 205, and a network 204. While FIG. 2A shows three client devices 202, one social networking system 205, and one external system 203, it should be appreciated that any number of these entities (including millions) may be included. In alternative configurations, different and/or additional entities may also be included in the system environment 201.

A client device 202 is a computing device capable of receiving user input, as well as transmitting and/or receiving data via the network 204. In one embodiment, a client device 202 sends requests to the audio identification system 100 to identify an audio signal captured or otherwise obtained by the client device 202. The client device 202 may additionally provide the audio signal or a digital representation of the audio signal to the audio identification system 100. Examples of client devices 202 include desktop computers, laptop computers, tablet computers (pads), mobile phones, personal digital assistants (PDAs), gaming devices, or any other device including computing functionality and data communication capabilities. Hence, the client devices 202 enable users to access the audio identification system 100, the social networking system 205, and/or one or more external systems 203. In one embodiment, the client devices 202 also allow various users to communicate with one another via the social networking system 205.

The network 204 may be any wired or wireless local area network (LAN) and/or wide area network (WAN), such as an intranet, an extranet, or the Internet. The network 204 provides communication capabilities between one or more client devices 202, the audio identification system 100, the social networking system 205, and/or one or more external systems 203. In various embodiments the network 204 uses standard communication technologies and/or protocols. Examples of technologies used by the network 204 include Ethernet, 802.11, 3G, 4G, 802.16, or any other suitable communication technology. The network 204 may use wireless, wired, or a combination of wireless and wired communication technologies. Examples of protocols used by the network 204 include transmission control protocol/Internet protocol (TCP/IP), hypertext transport protocol (HTTP), simple mail transfer protocol (SMTP), file transfer protocol (TCP), or any other suitable communication protocol.

The external system 203 is coupled to the network 204 to communicate with the audio identification system 100, the social networking system 205, and/or with one or more client devices 202. The external system 203 provides content and/or other information to one or more client devices 202, the social networking system 205, and/or to the audio identification system 100. Examples of content and/or other information provided by the external system 203 include identifying information associated with reference audio fingerprints, content (e.g., audio, video, etc.) associated with identifying information, or other suitable information.

The social networking system 205 is coupled to the network 204 to communicate with the audio identification system 100, the external system 203, and/or with one or more client devices 202. In one embodiment, the social networking system 205 is a computing system allowing its users to communicate, or to otherwise interact, with each other and to access content. Additionally, the social networking system 205 permits users to establish connections (e.g., friendship type relationships, follower type relationships, etc.) between one another.

In one embodiment, the social networking system 205 stores user accounts describing its users. User profiles are associated with the user accounts and include information describing the users, such as demographic data (e.g., gender information), biographic data (e.g., interest information), etc. Using information in the user profiles, connections between users, and any other suitable information, the social networking system 205 maintains a social graph of nodes interconnected by edges. Each node in the social graph represents an object associated with the social networking system 205 that may act on and/or be acted upon by another object associated with the social networking system 205. Examples of objects represented by nodes include users, non-person entities, content items, groups, events, locations, messages, concepts, and any other suitable information. An edge between two nodes in the social graph represents a particular kind of connection between the two nodes. For example, an edge corresponds to an action performed by an object represented by a node on another object represented by another node. For example, an edge may indicate that a particular user of the social networking system 205 is currently "listening" to a certain song. In one embodiment, the social networking system 205 may use edges to generate stories describing actions performed by users, which are communicated to one or more additional users connected to the users through the social networking system 205. For example, the social networking system 205 may present a story that a user is listening to a song to additional users connected to the user.

Figure 2B:
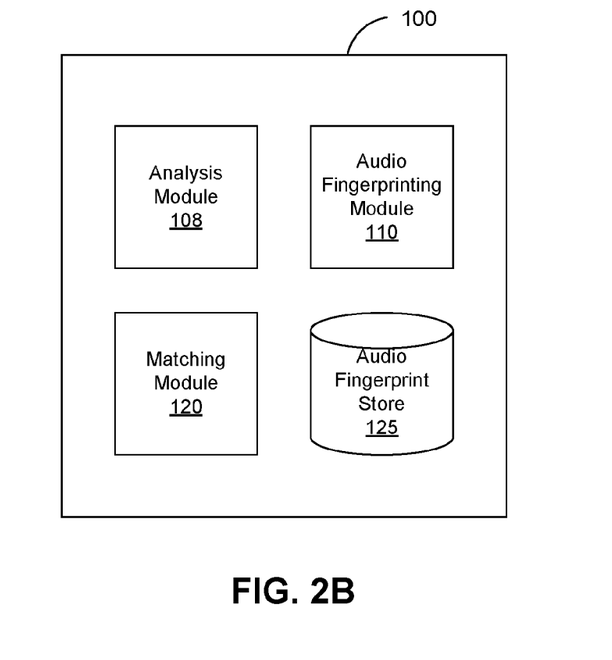
FIG. 2B is a block diagram of an audio identification system, in accordance with embodiments of the invention.

The audio identification system 100, further described below in conjunction with FIG. 2B, is a computing system configured to identify audio signals. FIG. 2B is a block diagram of one embodiment of the audio identification system 100. In the embodiment shown by FIG. 2B, the audio identification system includes an analysis module 108, an audio fingerprinting module 110, a matching module 120, and an audio fingerprint store 125.

The audio fingerprint store 125 stores one or more single reference audio fingerprints for social events, which are audio fingerprints previously generated from one or more audio signals by the audio identification system 100 or by another suitable entity. Each event reference audio fingerprint in the audio fingerprint store 125 is also associated with identifying information and/or other information related to the audio signal from which the reference audio fingerprint was generated. The identifying information may be any data suitable for identifying an audio signal. For example, the identifying information associated with a reference audio fingerprint includes event, title, artist, album, and publisher information for the corresponding audio signal.

In one embodiment, identifying information includes data indicating the source and location of an audio signal corresponding to a reference audio fingerprint associated with an event. As specific examples, the identifying information indicates that the source of an audio signal is a particular type of event or indicates a geographic location of an event associated with an audio signal from which a reference audio fingerprint was generated. For example, an audio signal is captured during an event at a specific geographic location, so a reference audio fingerprint corresponding to the audio signal captured during the event is associated with information indicating the geographic location (e.g., a location name, global positioning system (GPS) coordinates, etc.). As additional examples, a reference audio fingerprint associated with an event may identify one or more of a name of the event, a date and time associated with the event, artists associated with the event, a topic associated with the event, and one or more users of a social networking system attending the event. However, any suitable information describing an event may be associated with the reference audio fingerprint associated with the event.

In one embodiment, the audio fingerprint store 125 associates an index with each event reference audio fingerprint. Each index may be computed from a portion of the corresponding reference audio fingerprint. For example, a set of bits from a reference audio fingerprint corresponding to low frequency modulation or mel-frequency cepstral coefficients in the reference audio fingerprint may be used as the reference audio fingerprint's index The analysis module 108 performs analysis on samples of audio signals and/or modifies the samples based on the analysis. The analysis module 108 determines a length of a sample of an audio signal used to generate an audio fingerprint corresponding to the audio signal. In one embodiment, the length of the sample is based on a determined complexity of the audio signal from which the sample is obtained. To determine the complexity of the audio signal, the analysis module 108 performs an autocorrelation on the audio signal and identifies characteristics of the audio signal indicative of complexity from the autocorrelation. Based on the identified characteristics, the length of the sample is determined.

Additionally, the analysis module 108 determines whether various samples of audio signals are associated with an event. For example, the audio identification system 100 receives samples of audio signals from various client devices 202 along with information associated with the samples. By analyzing the information associated with the samples, the analysis module 108 identifies samples associated with an event. In one embodiment, the analysis module 108 determines that samples are associated with an event if information associated with the samples specifies a common location and times within a threshold time interval. As another example, information associated with samples includes check-in information associated with users, and the analysis module 108 determines that samples associated with check-in information indicating a specific location within a threshold time interval are associated with an event. The analysis module 108 identifies samples associated with an event and communicates the identified samples associated with the event to the audio fingerprinting module 110.

The audio fingerprinting module 110 generates audio fingerprints for audio signals of social events using any suitable audio fingerprinting algorithm. In one embodiment, the audio fingerprinting module 110 generates fingerprints for one or more audio signals using samples of the audio signals. Fingerprints generated from samples identified as associated with a common event by the analysis module 108 are combined by the audio fingerprinting module 108 to generate an audio fingerprint associated with the event. Generation of an audio fingerprint associated with an event from samples identified as associated with a common event is further described below in conjunction with FIG. 3.

The matching module 120 matches test audio fingerprints generated from audio signals to reference audio fingerprints to identify the audio signals. In particular, the matching module 120 identifies one or more candidate reference audio fingerprints from the audio fingerprint store 125 for comparing to a test audio fingerprint generated from an audio signal, and compares the identified candidate reference audio fingerprints to the test audio fingerprint. To identify a reference audio fingerprint matching a test audio fingerprint, a similarity score between the test audio fingerprint and various candidate reference audio fingerprints is computed. For example, a similarity score between the test audio fingerprint and each candidate reference audio fingerprint is computed. In one embodiment, the similarity score may be a bit error rate (BER) computed for the test audio fingerprint and a candidate reference audio fingerprint. The BER between two audio fingerprints is the percentage of their corresponding bits that do not match. For unrelated completely random fingerprints, the BER would be expected to be 50%. In one embodiment, two fingerprints are determined to be matching if the BER is less than approximately 35%; however, other threshold values may be specified. Based on the similarity scores, the subset of matches between the test audio fingerprint and the candidate reference audio fingerprints is identified.

For a candidate reference audio fingerprint matching the generated test audio fingerprint, the matching module 120 retrieves identifying information associated with the matching candidate reference audio fingerprint from the audio fingerprint store 125, from the external systems 203, from the social networking system 205, and/or from any other suitable entity. The identifying information may be used to identify the audio signal and the associated social event from which the test audio fingerprint was generated.

In other embodiments, any of the described functionalities of the audio identification system 100 may be performed by the client devices 102, the external system 203, the social networking system 205, and/or any other suitable entity. For example, the client devices 102 may be configured to determine a suitable length for a sample for fingerprinting, generate a test fingerprint usable for identifying an audio signal, and/or determine identifying information for an audio signal. In some embodiments, the social networking system 205 and/or the external system 203 may include the audio identification system 100.

Generating an Audio Fingerprint Associated with an Event

Figure 3:
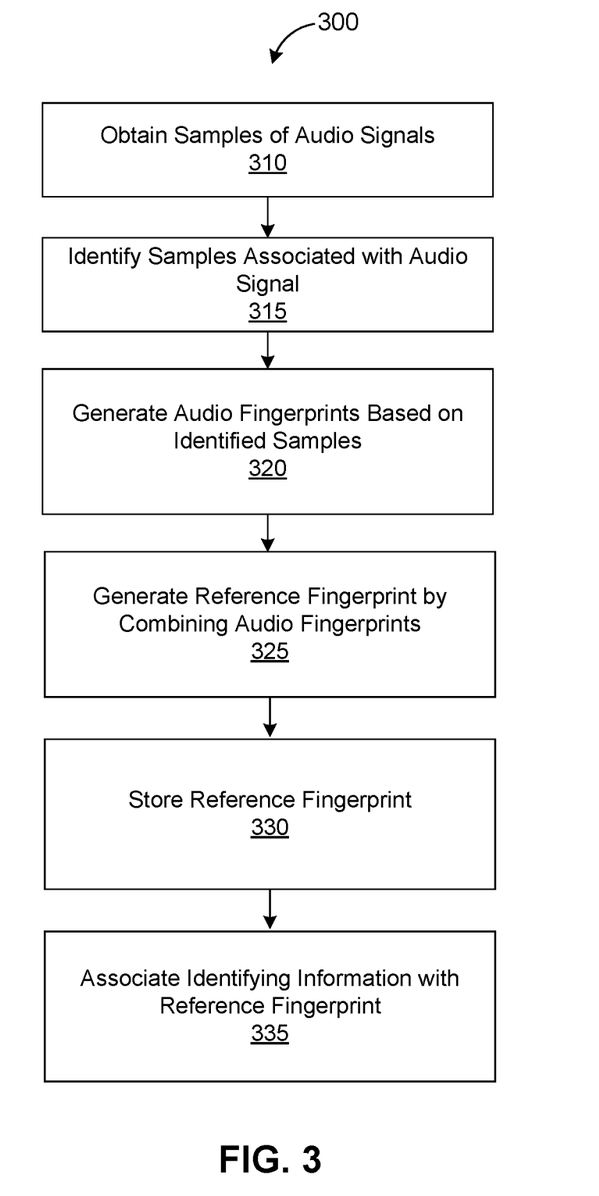
FIG. 3 is a flow chart of a process for generating a reference audio fingerprint associated with an event, in accordance with an embodiment of the invention.

FIG. 3 illustrates a flow chart of one embodiment of a method 300 for generating an audio fingerprint associated with an event. Other embodiments may perform the steps of the process 300 in different orders and may include different, additional and/or fewer steps. The process 300 may be performed by any suitable entity, such as the analysis module 108, the audio fingerprinting module 110, the matching module 120, or any combination thereof.

Multiple samples 104 of an audio signal 102 are obtained 310 from one or more client devices 202. The samples 104 may be received from various client devices 202. Alternatively example, the samples 104 may be retrieved from external systems 203 via the network 204. In one embodiment, multiple samples 104 associated with various audio signals 102 are obtained 310 along with identifying information associated with each of the samples 104. For example, identifying information specifies a time and/or location associated with a corresponding sample 104. The identifying information may also identify users of a social networking system 205 associated with a sample 104, check-in information specifying a location or event name, or other suitable information.

In one embodiment, identifying information associated with various samples 104 is analyzed to identify 315 samples associated with a common location and associated with times within a threshold time interval. The samples 104 associated with the common location and times within the threshold time interval are identified 315 as associated with an event. However, samples 104 having any suitable identifying information in common may be identified 315 as associated with an event.

Audio fingerprints are generated 320 based on each of the identified samples 104. In one embodiment, to generate an audio fingerprint for an identified sample 104, each frame 103 in the sample 104 is converted from the time domain to the frequency domain and a power spectrum for each frame 103 over a range of frequencies, such as 250 to 2250 Hz is computed. The power spectrum for each frame 103 in the sample 104 is split into a number of frequency bands within the range. For example, the power spectrum of a frame is split into 16 different bands within the frequency range of 250 and 2250 Hz. In one embodiment, to split a frame's power spectrum into multiple frequency bands, the audio fingerprinting module 110 applies a number of band-pass filters to the power spectrum. Each band-pass filter isolates a fragment of the audio signal 102 corresponding to the frame 103 for a particular frequency band. By applying the band-pass filters, multiple sub-band samples corresponding to different frequency bands are generated.

In generating 320 audio fingerprints for an identified sample, the audio fingerprinting module 110 transforms sub-band samples to produce a corresponding transformed sequence. Any suitable type of transform may be performed to generate a transformed sequence. Example types of transforms include Fast Fourier Transform, Fast Hartley Transform, Discrete Cosine Transform, Haar Transform, Wavelet transform, Singular Value Decomposition, and autocorrelation. In one embodiment, each resample sequence of each frame 103 is stored by the audio fingerprinting module 110 as a [M×T] matrix, which corresponds to a sampled spectrogram having a time axis and a frequency axis for a particular frequency band. Subsequently, the audio fingerprinting module 110 performs a transformation on the sampled spectrograms for each frequency band. In one embodiment, the audio fingerprinting module 110 applies a two-dimensional Discrete Cosine Transform (2D DCT) to the spectrograms. To perform the transform, the audio fingerprinting module 110 normalizes the spectrogram for each frequency band of each frame 103 and performs a one-dimensional DCT along the time axis of the normalized spectrogram. Subsequently, the audio fingerprinting module 110 performs a one-dimensional DCT along the frequency axis of the normalized spectrogram.

In particular, application of the 2D DCT generates a set of feature vectors for the frequency bands of each frame 103 in the sample 104. Based on the feature vectors for each frame 103, the audio fingerprinting module 110 generates 320 a partial reference audio fingerprint 116 for the audio signal 102. In one embodiment, in generating 320 the partial reference audio fingerprint 130, the fingerprinting module 110 quantizes the feature vectors for each frame 103 to produce a set of coefficients that each have one of a value of −1, 0, or 1. In an alternative embodiment, the fingerprinting module 110 quantizes the feature vectors for each frame 103 to produce a set of coefficients having a value of either 0 or 1. In one embodiment, differences are computed between feature vectors of pairs of adjacent frequency bands to generate the coefficients. For example, if a difference between feature vectors for a pair of adjacent frequency bands is greater than or equal to zero, a coefficient of 1 is selected, while a coefficient of 1 is selected if the difference between the feature vectors for the pair of adjacent frequency bands is less than zero.

In another embodiment, the fingerprint's feature vectors are quantized in multiple steps. Fingerprints generated along these steps are referred to as "intermediate" fingerprints, since their feature vectors are not fully quantized. For example, the feature vectors of intermediate fingerprints are initially quantized by using multiple bits to more accurately preserve relevant information. Intermediate fingerprints may be used to calculate a reference audio fingerprint based on multiple test audio fingerprints that have more than a threshold amount of distortion of the audio signal used to generate the test audio fingerprints. Features of the intermediate fingerprints are more accurately quantized using a large number of bits, yielding a better resolution and dynamic range of the audio signal represented by the fingerprints. A decreasing number of bits of the intermediate fingerprints are subsequently used to quantize feature vectors of the intermediate fingerprints, allowing intermediate fingerprints captured by multiple client devices to be combined into an averaged reference audio fingerprint allowing more accurate identification of an audio signal.

In yet another embodiment, feature vectors of the intermediate fingerprints are stored in their original and/or compressed format (e.g., a floating point format) rather than being quantized. In this embodiment, after additional processing, the average of the intermediate fingerprints is quantized to produce a set of coefficients having a value of either 0 or 1. Alternatively, the quantization produces a set of coefficients having a value of −1, 0, or 1.

A reference fingerprint associated with the event is generated 325 by combining the audio fingerprints generated from each of the identified samples 104. In one embodiment, the audio fingerprints are temporally aligned to form a temporally aligned series of the identified samples. For example, a phase correlation method is applied to the generated audio fingerprints to temporally align the identified samples 104 based on the feature vectors for each frame 103 in the identified samples 104. As another example, bit error rates for various pairings of the audio fingerprints are determined by comparing feature vectors for frames 103 in different audio fingerprints the audio fingerprints are aligned with each other based in part on the bit error rates for the various pairings. For example, the audio fingerprints are aligned so that the bit error rates between adjacent audio fingerprints are minimized.

When temporally aligning the samples 104, frames 103 from various samples 104 may overlap in a time interval, as different samples may correspond to temporally overlapping portions of the audio signal. Audio fingerprints overlapping in a time interval are averaged over the number of overlapping audio fingerprints, and the average of the temporally overlapping samples used as the value for the audio fingerprints in the reference audio fingerprint. In one embodiment, the values of the temporally overlapping audio fingerprint feature vectors are summed and divided by the number of temporally overlapping audio fingerprints to determine the average; however, any suitable method for averaging values of temporally overlapping audio fingerprints may be used.

The generated reference audio fingerprint is stored 330 and associated 335 with identifying information. For example, the reference audio fingerprint is associated 335 with information specifying an event name, a time, and a location of an event where samples of an audio signal were captured. However, additional or alternative information may be associated 335 with the reference audio fingerprint.

After storing 330 the generated reference audio fingerprint associated with the event, subsequently received test audio fingerprints 115 may be compared to the reference audio fingerprint. This allows determination of whether the test audio fingerprint 115 was generated from the audio signal from which the reference audio fingerprint was generated. For example, a similarity score between the test audio fingerprint 115 and the reference audio fingerprint associated with the event. In one embodiment, the similarity score is a bit error rate (BER) computed for the test audio fingerprint 115 and the reference audio fingerprint associated with the event. The BER between two audio fingerprints is the percentage of their corresponding bits that do not match. For unrelated completely random audio fingerprints, the BER would be expected to be 50%. In one embodiment, two audio fingerprints are determined to be matching if the BER is less than approximately 35%; however, other threshold values may be specified. Based on the similarity scores between the test audio fingerprint 115 and the reference audio fingerprint associated with the event, it is determined whether the test audio fingerprint 115 matches the reference audio fingerprint associated with the event.

If the test audio fingerprint 115 matches the reference audio fingerprint associated with the event, identifying information associated with the reference audio fingerprint associated with the event is retrieved. The identifying information may be retrieved 340 from the audio fingerprint store 125, one or more external systems 203, the social networking system 205, and/or any other suitable entity. The identifying information may be included in results provided by the matching module 115. For example, the identifying information is included in results sent to a client device 202 that initially requested identification of the audio signal 102. The identifying information allows a user of the client device 202 to determine information related to the audio signal 102. For example, the identifying information indicates that the audio signal 102 is associated with an event, indicates that the audio signal 102 is associated with a location, or indicates that the audio signal 102 is a song with a particular title, artist, or other information.

In one embodiment, the matching module 115 provides the identifying information to the social networking system 205 via the network 204. The matching module 115 may additionally provide an identifier for determining a user associated with the client device 202 from which a request to identify the test audio fingerprint 115 was received. For example, the identifier provided to the social networking system 205 indicates a user profile of the user maintained by the social networking system 205. The social networking system 205 may update the user's user profile to indicate that the user is currently listening to a song identified by the identifying information or that the user attended an event specified by the identifying information. In one embodiment, the social networking system 205 may communicate the identifying information to one or more additional users connected to the user over the social networking system 205. For example, additional users connected to the user requesting identification of an audio signal 102 associated with the test fingerprint 115 may receive content identifying the user and indicating the identifying information for the audio signal 102, such as an identification of the event associated with the audio signal 102, identification of other users that attended the event associated with the audio signal 102, or other suitable information.

In one embodiment, the matching module may calculate relative positions and distance between client devices associated with users attending the same event. The relative positing and distance between a user's client device and other client devices attending the event may be communicated to the user's client device along with identifiers of users associated with other client devices attending the event. Additional information, such as distance between the user's client device and another client device, common interests between the user associated with the client device and users associated with other client devices attending the event may be presented or used to modify an order in which the identifiers associated with other client devices attending the event are presented. Comparing test fingerprints generated from samples of an audio signal captured by client devices 202 allows match scores between various test fingerprints to be determined, which may be used to estimate relative distance and bearing between various client devices 202 that may affect presentation of information about users associated with the client devices 202 to a user. The social networking system 205 may communicate the content to the additional users via a story that is included in a newsfeed associated with each of the additional users.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving a first audio signal from a first client device of a first user of an online system, the first audio signal corresponding to a recording at an event attended by a plurality of users of the online system, the plurality of users including the first user and a second user;
receiving a second audio signal from a second client device of the second user;
generating a first audio fingerprint based on the first audio signal;
generating a second audio fingerprint based on the second audio signal;
comparing the first audio fingerprint to the second audio fingerprint; and in response to the comparison of audio fingerprints being within a threshold similarity, providing a notification to the first client device informing the first user that the second user is also attending the event.

2. The computer-implemented method of claim 1, further comprising:
extracting noise levels from the first and second audio signals, the first and second audio fingerprints being generated based on the extracted noise levels.

3. The computer-implemented method of claim 1, wherein comparing the first and second audio fingerprints is based on a time interval between when the first audio signal and the second audio signals are received.

4. The computer-implemented method of claim 1, further comprising, in response to the comparison of audio fingerprints being within the threshold similarity, providing another notification to the second client device informing the second user that the first user is also attending the event.

5. The computer-implemented method of claim 1, wherein the event is a live event selected from a group consisting of: a concert, symphony, gathering, ceremony, movie, show, musical, and sports event.

6. The computer-implemented method of claim 1, wherein the first audio signal and the second audio signal each represent a song, and wherein the method further comprises:
identifying a title and an artist of the song; and
modifying a user profile of the first user on the online system to indicate that the first user is listening to the song and to indicate the title and the artist of the song.

7. The computer-implemented method of claim 1, further comprising determining, in response to the comparison of audio fingerprints being within the threshold similarity, a real world relationship between the first user and the second user.

8. The computer-implemented method of claim 1, wherein generating the first and second audio fingerprints comprises:
converting the first and second audio signals from the time domain to the frequency domain; and
applying a band-pass filter to the converted audio signals.

9. The computer-implemented method of claim 1, wherein the comparison of audio fingerprints indicates a bit error rate, and wherein the threshold similarity is greater than 50%.

10. A computer-implemented method comprising:
receiving a first audio signal from a first client device of a first user of an online system, the first audio signal corresponding to a recording at an event attended by a plurality of users of the online system, the plurality of users including the first user and a second user;
receiving a second audio signal from a second client device of the second user;
generating a first audio fingerprint based on the first audio signal;
generating a second audio fingerprint based on the second audio signal;
comparing the first audio fingerprint to the second audio fingerprint; and
in response to the comparison of audio fingerprints being within a threshold similarity, determining a physical distance between the first client device and the second client device at the event.

11. The computer-implemented method of claim 10, further comprising:

receiving a third audio signal from a third client device of a third user, wherein the plurality of users includes the third user; and
wherein determining the physical distance between the first client device and the second client device at the event is based on triangulation using each of the audio signals.

12. The computer-implemented method of claim 10, wherein comparing the first and second audio fingerprints comprises identifying a low frequency portion and a high frequency portion of the first and second audio signals.

13. A computer program product comprising a non-transitory computer readable storage medium having instructions encoded thereon that, when executed by a processor, cause the processor to:
receive a first audio signal from a first client device of a first user of an online system, the first audio signal corresponding to a recording at an event attended by a plurality of users of the online system, the plurality of users including the first user and a second user;
receive a second audio signal from a second client device of the second user;
generate a first audio fingerprint based on the first audio signal;
generate a second audio fingerprint based on the second audio signal;
compare a the first audio fingerprint to the second audio signal; and
in response to the comparison of audio fingerprints being within a threshold similarity, provide a notification to the first client device informing the first user that the second user is also attending the event.

14. The non-transitory computer readable storage medium of claim 13, having further instructions that when executed by the processor cause the processor to:
extract noise levels from the first and second audio signals, the first and second audio fingerprints being generated based on the extracted noise levels.

15. The non-transitory computer readable storage medium of claim 13, wherein comparing the first and second audio fingerprints is based on a time interval between when the first audio signal and the second audio signals are received.

16. The non-transitory computer readable storage medium of claim 13, having further instructions that when executed by the processor cause the processor to, in response to the comparison of audio fingerprints being within the threshold similarity, provide another notification to the second client device informing the second user that the first user is also attending the event.

17. The non-transitory computer readable storage medium of claim 13, wherein the event is a live event selected from a group consisting of: a concert, symphony, gathering, ceremony, movie, show, musical, and sports event.

18. The non-transitory computer readable storage medium of claim 13, wherein the first audio signal and the second audio signal each represent a song, and having further instructions that when executed by the processor cause the processor to:
identify a title and an artist of the song; and
modify a user profile of the first user on the online system to indicate that the first user is listening to the song and to indicate the title and the artist of the song.

19. The non-transitory computer readable storage medium of claim 13, having further instructions that when executed by the processor cause the processor to determine, in response to the comparison of audio fingerprints being within the threshold similarity, a real world relationship between the first user and the second user.

20. The non-transitory computer readable storage medium of claim 13, wherein generating the first and second audio fingerprints comprises:
  convert the first and second audio signals from the time domain to the frequency domain; and
  apply a band-pass filter to the converted audio signals.

* * * * *

UNITED STATES PATENT AND TRADEMARK OFFICE
CERTIFICATE OF CORRECTION

PATENT NO. : 9,899,036 B2
APPLICATION NO. : 15/252464
DATED : February 20, 2018
INVENTOR(S) : Bilobrov Page 1 of 1

It is certified that error appears in the above-identified patent and that said Letters Patent is hereby corrected as shown below:

In the Claims

Column 16, Line 28, after "compare" delete "a".
Column 16, Line 29, before "; and" delete "signal" and insert -- fingerprint --.

Signed and Sealed this
Seventeenth Day of July, 2018

Andrei Iancu
*Director of the United States Patent and Trademark Office*